No. 690,734. Patented Jan. 7, 1902.
H. JARVIS.
BICYCLE SEAT.
(Application filed Aug. 19, 1901.)
(No Model.) 2 Sheets—Sheet 1.
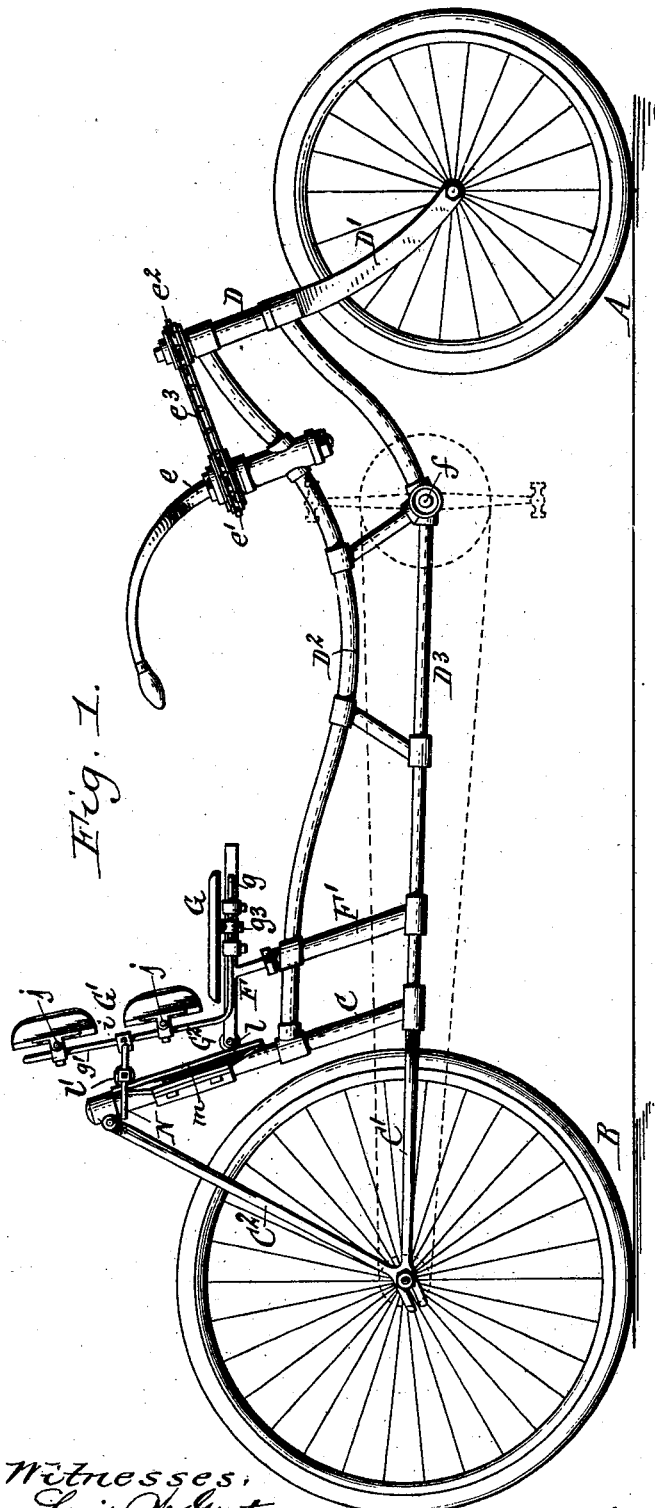
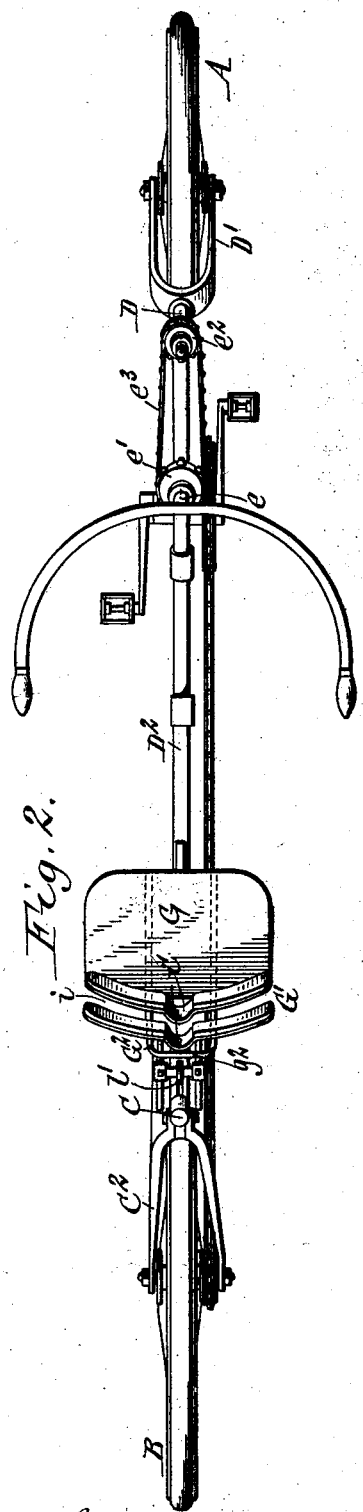
Witnesses:
Louis W. Gratz
Emma M. Graham
Harold Jarvis, Inventor
By Geyer & Popp Attorneys
THE NORRIS PETERS CO., PHOTO-LITHO., WASHINGTON, D. C.

No. 690,734. Patented Jan. 7, 1902.
H. JARVIS.
BICYCLE SEAT.
(Application filed Aug. 19, 1901.)
(No Model.) 2 Sheets—Sheet 2.
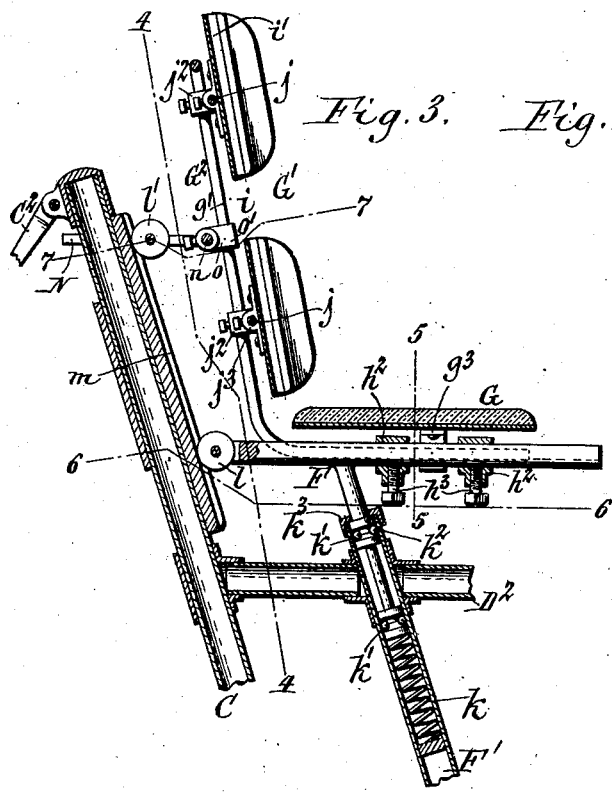
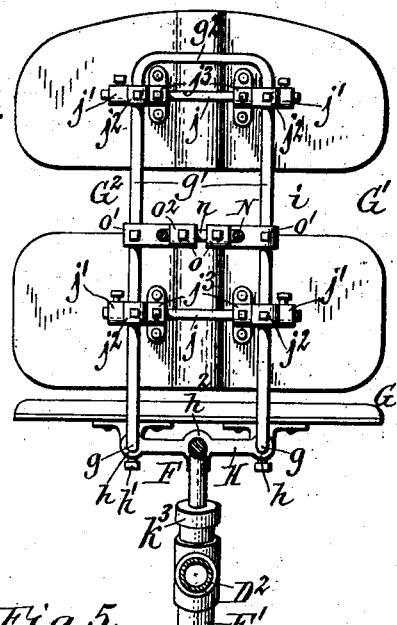
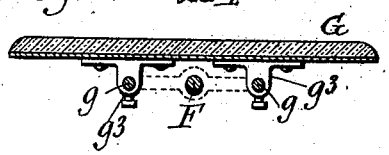
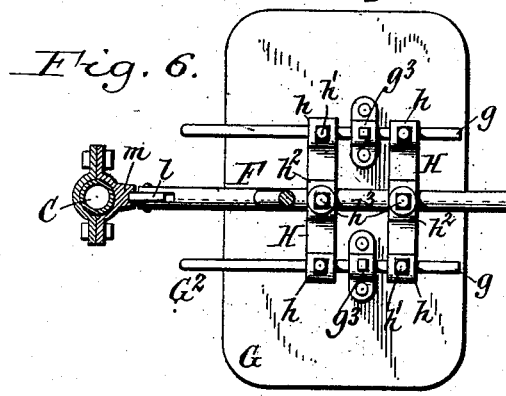
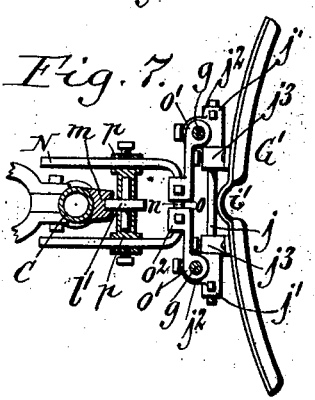
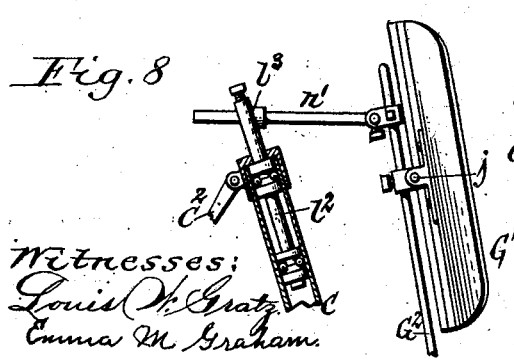
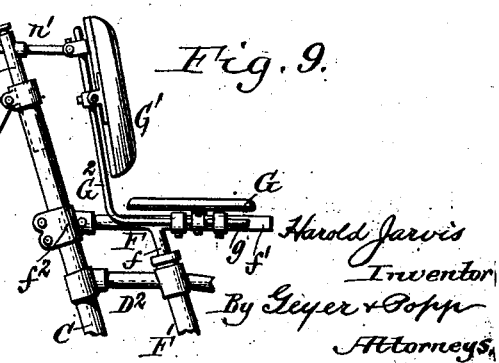
Witnesses:
Louis N. Gratz
Emma M. Graham.
Harold Jarvis
Inventor
By Geyer & Popp
Attorneys
THE NORRIS PETERS CO., PHOTO-LITHO., WASHINGTON, D. C.

UNITED STATES PATENT OFFICE.

HAROLD JARVIS, OF BUFFALO, NEW YORK, ASSIGNOR OF ONE-HALF TO RICHARD H. THOMPSON, OF BUFFALO, NEW YORK.

BICYCLE-SEAT.

SPECIFICATION forming part of Letters Patent No. 690,734, dated January 7, 1902.

Application filed August 19, 1901. Serial No. 72,462. (No model.)

*To all whom it may concern:*

Be it known that I, HAROLD JARVIS, a citizen of the United States, residing at Buffalo, in the county of Erie and State of New York, have invented new and useful Improvements in Bicycle-Seats, of which the following is a specification.

This invention relates to a seat and attachments for the same, designed more particularly for use on a bicycle in which the seat is comparatively low and provided with a back-rest and in which the cranks are located some distance in advance of the seat, the rider applying pressure to the pedals in a forward and downward direction and thrusting his back against the back-rest of the seat in propelling the machine. A bicycle of this character is described and shown in another application for patent filed by me on or about the 17th day of June, 1901, Serial No. 64,777. Owing to the powerful thrust exerted against the back-rest of the seat, the same must be very strong; and it is one of the objects of my present invention to produce a seat which possesses the necessary strength and has its back-rest effectually braced and which is at the same time light and durable in construction.

Another object of the invention is to render the seat adjustable toward and from the cranks in a convenient manner to suit riders of different statures.

In the accompanying drawings, consisting of two sheets, Figure 1 is a side elevation of a bicycle provided with my improved seat. Fig. 2 is a top plan view thereof. Fig. 3 is a sectional elevation of the seat and adjacent members of the bicycle-frame on an enlarged scale. Fig. 4 is a transverse vertical section in line 4 4, Fig. 3. Fig. 5 is a similar section in line 5 5, Fig. 3. Fig. 6 is a horizontal section in line 6 6, Fig. 3, looking upward. Fig. 7 is a horizontal section in line 7 7, Fig. 3. Fig. 8 is a fragmentary sectional elevation of the seat and the bicycle-frame, showing a modified construction of the seat-brace. Fig. 9 is a fragmentary side elevation of another modified construction.

Like letters of reference refer to like parts in the several figures.

A is the steering-wheel and B the driving-wheel.

C, C', and $C^2$ are the members which constitute the raised triangular rear part of the bicycle-frame.

D is the steering-head, D' the front fork, and $D^2$ $D^3$ the upper and lower reach members extending rearwardly from the steering-head to the base portion of the rear part of the frame and constituting the depressed front part of the frame.

$e$ is the steering-post, connected with the rotary stem of the front fork by sprocket-wheels $e'$ $e^2$ and a chain $e^3$, and $f$ is the crank-shaft, mounted on the depressed front part of the frame below the steering-post.

F is a T-shaped seat-post arranged above the depressed portion of the frame immediately in front of the upright member C of its raised rear part and telescoping into an upright supporting-tube F', secured to the upper and lower reach members D' $D^2$.

My improved seat, which is mounted on the T-post F, is composed of the seat proper, G, a back-rest G', and a frame $G^2$, to which said parts are attached. The frame $G^2$ comprises a pair of horizontal rods $g$, arranged lengthwise of the frame on opposite sides of the horizontal arm or head of the T-post F, and a pair of nearly-upright rods $g'$, extending upwardly from the rear ends of the longitudinal rods $g$ and connected at their upper ends by a cross-bar $g^2$, this bar and the several rods being preferably bent from a single rod of spring-steel. As shown in Figs. 1 and 6, the seat G is secured to the longitudinal frame-rods $g$ by clips $g^3$ or other suitable fastenings. These rods pass through eyes $h$, arranged at the ends of a pair of cross-bars H, and are secured therein by set-screws $h'$ or other suitable means. The cross-bars H are adjustably mounted on the horizontal head or member of the T-post F and for this purpose are provided centrally with eyes $h^2$, which embrace said post member and carry clamping or set screws $h^3$, which bear against the same, as seen in Figs. 1, 3, and 6.

The back-rest G' of the seat preferably comprises two similar parts or sections, as shown, which sections extend across the front side of the upright rods $g'$ and are curved to conform to the rider's back. They are preferably separated to leave a space $i$ for receiving the portion of the rider's back where the protuberant parts, such as the rear trouser-buttons and the crossed parts of the suspenders, are located, thus relieving the rider from the pressure of these parts. For a similar purpose the sections of the back are provided centrally in their front sides with vertical grooves or depressions $i'$, which receive the backbone.

The back-rest sections are made vertically adjustable on the upright rods $g'$ by attachments of any suitable construction. The preferred attachments (shown in the drawings) consist of transverse rods $j$, supported at their ends in horizontal sleeves or bearings $j'$ and provided on their rear sides with upright eyes $j^2$, which encircle the upright rods $g'$ of the seat-frame, as most clearly shown in Figs. 3, 4, and 7. The eyes $j^2$ are adjustably clamped to the rods $g'$ by set-screws, as shown, or other suitable means. The back-rest sections are attached to the transverse rods $j$ by clips $j^3$, having horizontal eyes which encircle said rods. These clips may be loosely swiveled on the rods $j$ to allow the back-rest sections to accommodate themselves to the rider's back, or the clips may be clamped to said rods by set-screws, as shown.

The seat-post F is preferably vertically movable in the supporting-tube F′ and suitably cushioned by a spring $k$, Fig. 3. The post is provided with ball-bearings $k'$ of any approved construction to minimize friction, and its upward movement is limited by the upper bearing-collar $k^2$ of the post and a cap $k^3$, applied to the upper end of the supporting-tube F′.

In order to brace and stiffen the back-rest of the seat, the same is provided at or near its upper end with a rearwardly-extending brace, connection, or attachment, which is adapted to engage or abut against the adjacent upright member C of the raised rear part of the bicycle-frame or be secured thereto. When a cushioned seat-post is employed, as shown in Figs. 1 to 7, this rear bracing is preferably applied also to the seat and effected by applying a lower antifriction or guide roller $l$ to the seat-post and an upper antifriction-roller $l'$ to the back-rest, which rollers run against a grooved upright track $m$, arranged on the front side of the elevated frame member C, as shown in Figs. 1, 3, 6, and 7. The lower roller $l$ is journaled at the rear end of the seat-post, while the upper roller $l'$ is journaled in a yoke or bracket N, the arms of which extend rearwardly on opposite sides of the elevated frame member C and the bow $n$ of which is attached to a cross-bar $o$, which bridges the upright members $g'$ of the seat-frame, as shown in Figs. 4 and 7. This cross-bar is preferably divided centrally into two sections, each of which is provided at its outer end with a vertical eye $o'$, which embraces the adjacent rod $g'$, and at its inner end with a horizontal or transverse eye $o^2$, which receives the bow of the yoke N. The sectional cross-bar $o$ is adjustably clamped to the rods $g'$ by set-screws, and the bow of the yoke N is similarly clamped in the eyes of said cross-bar by set-screws, as seen in Fig. 7. This yoke is preferably bent from a single piece of heavy steel wire, and the purpose of making the cross-bar $o$ in two sections is to permit its transverse eyes to be passed over the arms of the yoke and around the bends thereof in assembling the parts. The upper guide-roller $l'$ may be journaled in the yoke N in any suitable manner. In the construction shown in the drawings, Fig. 7, its journals are seated in bearings $p$, which are adjustable on the yoke-arms toward and from the elevated frame member C and clamped in position by set-screws. By this improved construction a rigid rear abutment is provided for the back-rest of the seat which effectually withstands the powerful thrust exerted against the back-rest by the rider, especially in propelling the bicycle up a hill, and the seat is at the same time free to vibrate vertically with its cushioned seat-post.

The seat can be adjusted forwardly or backwardly, as may be required by the length of the rider's limbs, by simply loosening the set-screws of the seat-carrying cross-bars H, shifting these bars on the seat-post as required, and again tightening the set-screws. This adjustment of the seat requires a corresponding adjustment of the upper thrust-roller $l'$, and to effect this adjustment the set-screws of the bearings $p$ are loosened, the bearings slid to the proper position to bring the roller in contact with the track $m$, and the set-screws again tightened.

By making the seat-frame of a continuous piece of comparatively heavy steel wire its construction is light, simple, and inexpensive.

While preferring the construction of the back-rest brace hereinbefore described, I do not wish to limit myself to any particular construction of the same, as it may be modified in various ways without departing from my invention. For example, as shown in Fig. 8, the brace may consist of a rod $n'$, attached at its front end to the upright member $G^2$ of the seat-frame and at its rear end to the projecting upper end of a ball-bearing stem $l^2$, capable of sliding up and down in the elevated upright member C of the bicycle-frame for following the corresponding movements of the cushioned seat-post. In this modification the rear portion of the brace is longitudinally adjustable in a socket $l^3$ at the upper end of the stem $l^2$, in which socket it is clamped by a set-screw.

Fig. 9 shows another modification in which the stem $f$ of the seat-post F is rigidly secured to the seat-tube F′. The rear end of its head $f'$ is secured to the frame member C by a clamp $f^2$, and the stem $l^4$, carried by the frame member C, is rigidly secured to said member.

I claim as my invention—

1. The combination of a bicycle-frame comprising a steering-head, a rear-wheel frame and a reach member extending rearwardly from the steering-head and connected at its rear end to the lower front end of said rear-wheel frame, whereby the upper portion of the latter frame projects above the reach member, a seat having a back-rest and supported upon said reach member immediately in front of the projecting upper portion of said rear-wheel frame, and a brace or connection extending rearwardly from the back-rest of the seat to the adjacent raised portion of said rear-wheel frame, substantially as set forth.

2. In a bicycle-seat the combination of a seat-post having a horizontal member, a seat proper capable of forward and backward adjustment on the horizontal member of the seat-post, a back-rest attached to the seat, and an adjustable brace extending rearwardly from the back-rest and constructed to engage with a member of a bicycle-frame located in rear of the back-rest, substantially as set forth.

3. The combination of a bicycle-frame, a vertically-movable seat having a back-rest, a brace extending rearwardly from the back-rest, and a guide-roller carried by said brace and arranged to bear against an upright member of the bicycle-frame located in rear of the back-rest, substantially as set forth.

4. In a bicycle-seat, the combination of a vertically-movable seat-post having a horizontal member provided at its rear end with a guide-roller, a seat proper mounted on said seat-post and having a back-rest, and a brace attached at its front end to the back-rest and provided at its rear end with a guide-roller, said guide-rollers being arranged to run against a member of the bicycle-frame located in rear of the back-rest, substantially as set forth.

5. The combination of a bicycle-frame having its rear portion raised above its front portion, a vertically-movable seat-post mounted on the depressed portion of the frame immediately in front of the raised portion thereof and having a head provided at its rear end with a roller which runs against the adjacent raised portion of the bicycle-frame, and a seat mounted on said head, substantially as set forth.

6. A vertically-movable bicycle-seat having a back-rest, a brace-yoke extending rearwardly from said rest, and a guide-roller journaled between the arms of the yoke and adapted to run against the bicycle-frame, substantially as set forth.

7. A bicycle-seat having a frame provided with upright members, a back-rest attached to said members, a cross-bar composed of sections attached at their outer ends to said upright members and provided at their inner ends with horizontal eyes, a brace-yoke formed in a single piece and having its bow arranged in the eyes of said cross-bar, and a guide-roller journaled between the arms of said yoke, substantially as set forth.

8. In a bicycle-seat, the combination of a frame composed of a pair of horizontal bars arranged side by side and a pair of connected upright bars extending upwardly from the rear ends of said horizontal bars, a pair of separated transverse bars connecting said horizontal bars and provided centrally with eyes adapted to receive the head of a seat-post, a seat provided on its under side with clips which are attached to said horizontal frame-bars between said transverse bars, and a back-rest attached to said upright frame-bars, substantially as set forth.

9. A bicycle-seat having a back-rest provided centrally in its front side with a vertical groove, and having the portions thereof on opposite sides of the groove rounded to conform closely to the rider's back, forming a broad abutment which, when the seat is occupied, is in contact with the rider's back throughout its width, substantially as set forth.

Witness my hand this 14th day of August, 1901.

HAROLD JARVIS.

Witnesses:
  THEO. L. POPP,
  CARL F. GEYER.